US009371080B2

(12) United States Patent
Dilone, Jr.

(10) Patent No.: US 9,371,080 B2
(45) Date of Patent: Jun. 21, 2016

(54) APPARATUS FOR OUTDOORSMEN

(71) Applicant: NES World Group, Mt. Clemens, MI (US)

(72) Inventor: Greg Dilone, Jr., Mt. Clemens, MI (US)

(73) Assignee: NORTHEAST VENTURES LLC, Mt. Clemens, MI (US)

(*) Notice: Subject to any disclaimer, the term of this patent is extended or adjusted under 35 U.S.C. 154(b) by 0 days.

(21) Appl. No.: 14/289,837

(22) Filed: May 29, 2014

(65) Prior Publication Data

US 2015/0197260 A1    Jul. 16, 2015

Related U.S. Application Data

(60) Provisional application No. 61/926,669, filed on Jan. 13, 2014.

(51) Int. Cl.
| | |
|---|---|
| *B62B 1/12* | (2006.01) |
| *A01M 31/02* | (2006.01) |
| *B62B 1/20* | (2006.01) |
| *E04H 15/00* | (2006.01) |
| *E04H 15/02* | (2006.01) |
| *E04H 15/30* | (2006.01) |
| *B62B 1/00* | (2006.01) |
| *B62B 5/00* | (2006.01) |
| *B62B 5/06* | (2006.01) |
| *B62B 19/04* | (2006.01) |

(52) U.S. Cl.
CPC ............. *B62B 1/125* (2013.01); *A01M 31/025* (2013.01); *B62B 1/20* (2013.01); *E04H 15/001* (2013.01); *E04H 15/02* (2013.01); *E04H 15/30* (2013.01); *B62B 1/008* (2013.01); *B62B 5/0079* (2013.01); *B62B 5/068* (2013.01); *B62B 19/04* (2013.01); *B62B 2202/402* (2013.01); *B62B 2202/52* (2013.01); *B62B 2205/10* (2013.01)

(58) Field of Classification Search
CPC .... B62B 1/125; B62B 1/008; B62B 2202/42; B62B 15/00; B62B 15/007; B62B 2202/402; A01M 31/025; A01M 31/02; A01M 31/00; A01M 31/006; A01M 31/025; Y10S 135/901; A22B 7/006; E04H 15/06; A31M 31/00; A31M 31/006; A31M 31/02; A31M 31/025
USPC ......................................................... 280/656
See application file for complete search history.

(56) References Cited

U.S. PATENT DOCUMENTS

| | | | | |
|---|---|---|---|---|
| 4,526,391 A * | 7/1985 | Winkelman et al. | ......... | 280/19.1 |
| 5,492,196 A * | 2/1996 | Michno | ........................... | 182/20 |
| 6,017,081 A * | 1/2000 | Colby | ........................... | 296/173 |
| 6,397,870 B1 * | 6/2002 | Makedonsky et al. | ........ | 135/116 |
| 6,802,327 B2 * | 10/2004 | Koss | ........................... | 135/88.08 |
| 7,229,060 B2 * | 6/2007 | Collins | ........................ | 248/534 |
| 7,284,762 B2 * | 10/2007 | Mehtonen | .................... | 280/19.1 |
| 7,392,994 B2 * | 7/2008 | Darling, III | ................ | 280/47.18 |
| 7,503,607 B2 * | 3/2009 | Sersland et al. | ........... | 296/26.09 |
| 7,959,182 B2 * | 6/2011 | Klein | ............................ | 280/652 |
| 2008/0284119 A1 * | 11/2008 | Williamson | .................... | 280/30 |
| 2013/0249176 A1 * | 9/2013 | Bengtzen | ........................ | 280/30 |

* cited by examiner

*Primary Examiner* — John Walters
*Assistant Examiner* — Brian Swenson
(74) *Attorney, Agent, or Firm* — Stephen T. Olson; Harness, Dickey & Pierce, P.L.C.

(57) ABSTRACT

A multi-use apparatus for outdoorsmen including a tub and first, second, third and fourth adjustable legs. The adjustable legs are mounted to the tub. Each of the legs includes a mounting member and a telescopic member. Each mounting member is non-rotatably mounted to the tub.

20 Claims, 25 Drawing Sheets

APPARATUS FOR OUTDOORSMEN

CROSS-REFERENCE TO RELATED APPLICATIONS

This application claims the benefit of U.S. Provisional Patent Application No. 61/926,669 filed 13 Jan. 2014, which application is herein expressly incorporated by reference.

FIELD

The present disclosure generally relates to an apparatus for outdoorsmen. The present disclosure more particularly relates to a multi-use apparatus for outdoorsmen that is easy to transport and may be used in various orientations.

BACKGROUND

Hunters and fishermen conventionally use various devices for transporting gear. To a limited extent, it is known in the art to provide a device for transporting hunting or fishing gear that may be converted into a shelter or blind. One such device is shown and described in commonly assigned U.S. Pat. No. 7,959,182. U.S. Pat. No. 7,959,182 is incorporated by reference as if fully set forth herein.

While known device for transporting hunting and fishing gear, including but not limited to the device of U.S. Pat. No. 7,959,182, have proven to be suitable for their intended uses, a continuous need for advancement in the relevant arts is needed.

SUMMARY

In accordance with one particular aspect, the present teachings provide a multi-use apparatus for outdoorsmen including a tub and first, second, third and fourth adjustable legs. The adjustable legs are mounted to the tub. Each of the legs includes a mounting member and a telescopic member. Each mounting member non-rotatably mounted to the tub.

In accordance with another particular aspect, the present teachings provide a multi-use apparatus for outdoorsmen. The apparatus includes a tub and a plurality of canopy supports. Each canopy support is pivotably coupled to the tub for movement between a stowed position and a deployed position. The plurality of canopy supports cooperate to adjustably support a canopy.

In accordance with yet another particular aspect, the present teachings provide a multi-use apparatus for outdoorsmen includes a tub; and first and second mounting plates secured to laterally opposite sides of the tub. A first pair of adjustable legs includes first and second adjustable legs. A second pair of adjustable legs includes second and third adjustable legs. Each of the first, second, third and fourth adjustable legs includes a mounting portion and an adjustable portion. Each mounting portion is secured to one of the first and second mounting plates.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
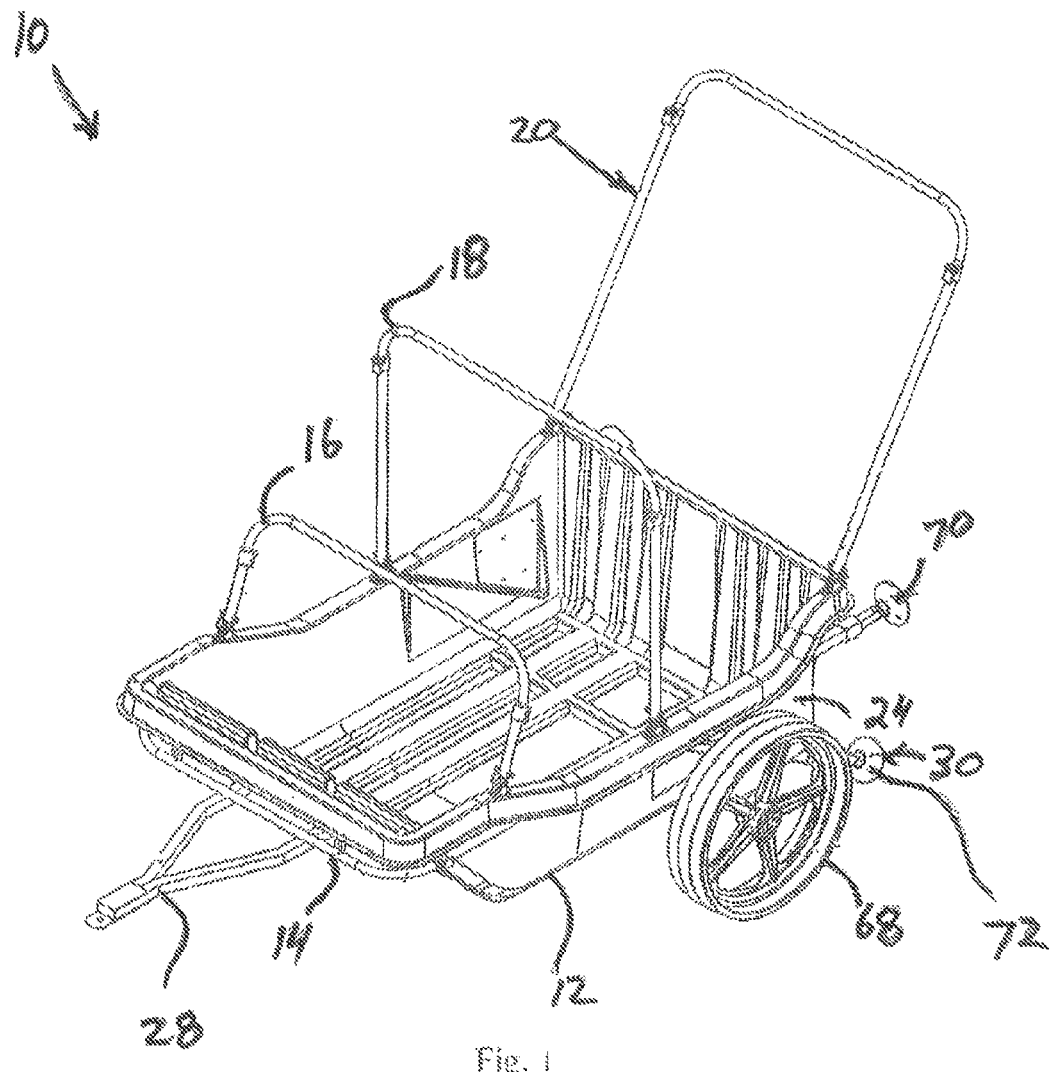
FIG. 1 is a perspective view of an apparatus for outdoorsmen constructed in accordance with the present teachings.
Figure 2:
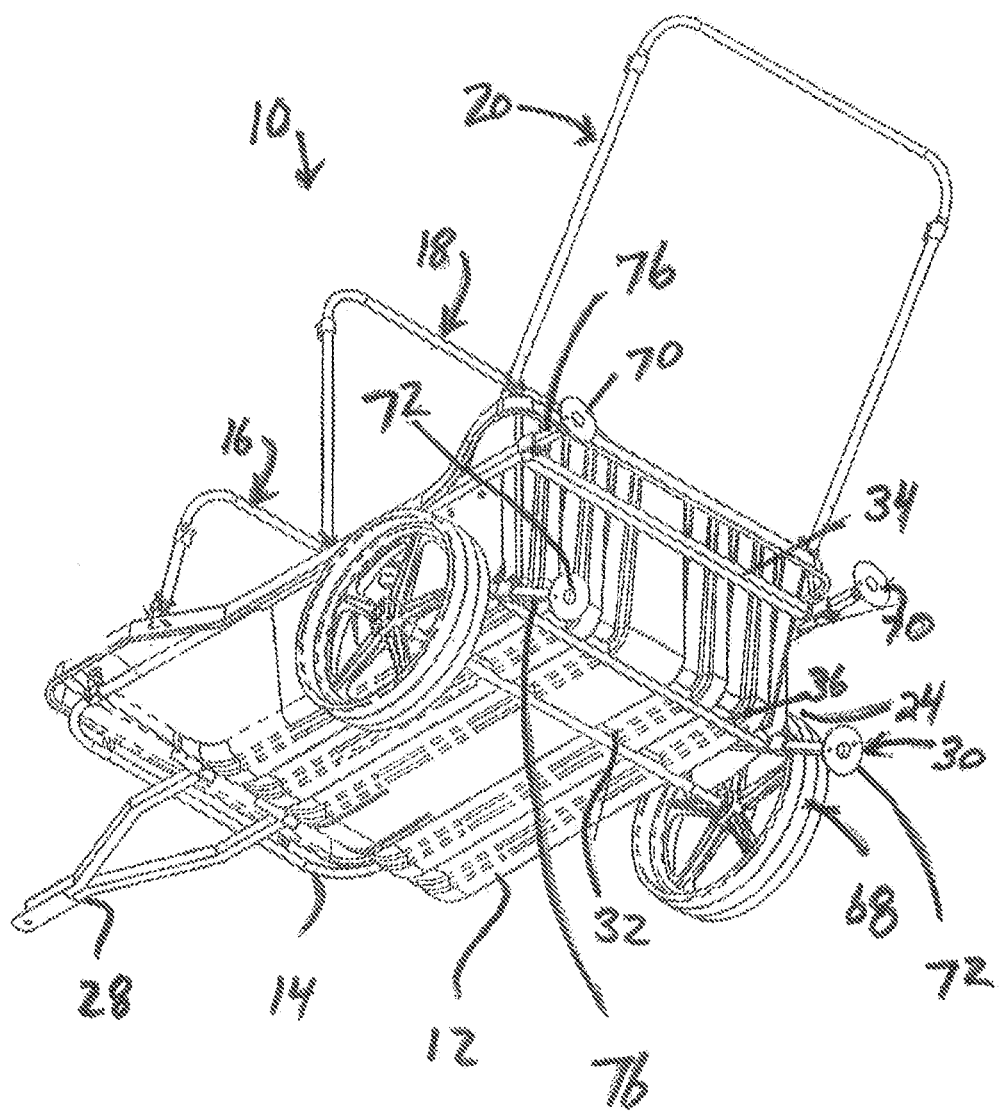
FIG. 2 is another perspective view of the apparatus of FIG. 1.

Example embodiments will now be described more fully with reference to the accompanying drawings.

With initial reference to FIGS. 1 through 12, an apparatus for outdoorsmen constructed in accordance with the present teachings is illustrated and generally identified at reference character 10. The apparatus 10 is shown to generally include the following elements:

12 a tub
14 a retractable handle assembly
16 a front canopy support
18 a mid-canopy support
20 a rear canopy support
22 a wheel and axle assembly
24 a pair of frame assemblies
28 a hitch assembly
30 a support leg assembly
32 an axle tube
34 an upper tub support member
36 a lower tub support member The tub 12 is constructed of plastic or other suitable material of sufficient strength and durability. As is well known in the art, the tub 12 may be reinforced with structural members or braces to provide additional strength or for purposes of securing various elements to the tub 12. For example, the upper tube support member 34 and the lower tub support member 36 are provided.

Figure 3:
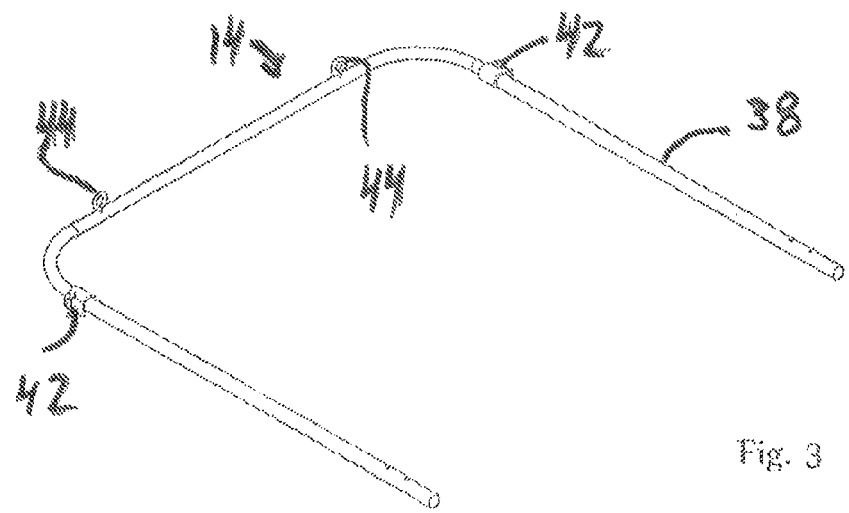
FIG. 3 is a perspective view of a retractable handle assembly of the apparatus of the present teachings, it being understood that the handle assembly may additionally incorporate handle grips.
Figure 4:
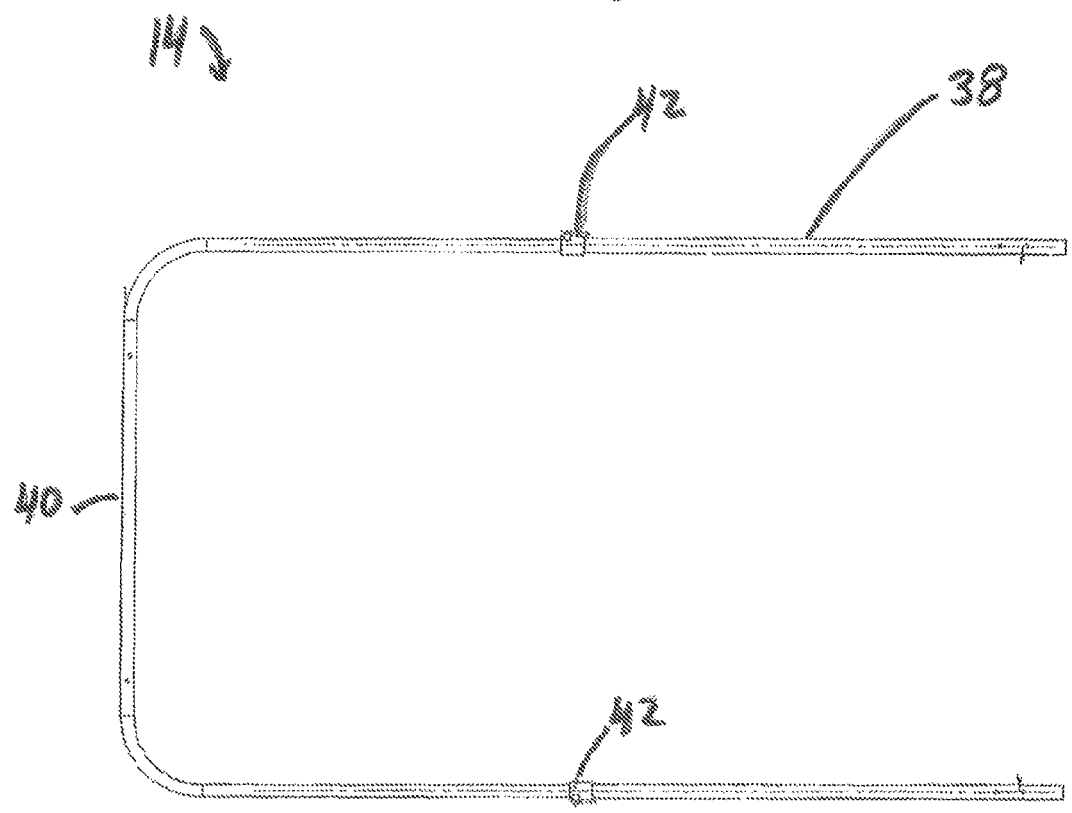
FIG. 4 is a plan view of the retractable handle assembly of the apparatus of the present teachings.

With particular reference to FIGS. 1 through 4, the retractable handle assembly 14 will be further described. The retractable handle assembly 14 is illustrated to generally include a pair of mounting tubes 38 and a handle 40. The mounting tubes 38 may be securely fastened to the tub 12 in any manner well known in the art. In the embodiment illustrated, the mounting tubes 38 are circular in cross section. It will be understood, however, that alternative cross sections may be employed within the scope of the present teachings. The handle 40 is generally U-shaped having a pair of legs connected by an intermediate portion. The legs have a cross section that cooperates with the mounting tubes 38 for telescopic adjustability. Thus, in the embodiment illustrated, the legs have a circular cross section. The legs are telescopically received within the mounting tubes 38. Latches 42 may be carried by both of the mounting tubes 38 for retaining the handle 40 in a desired telescopic position relative to the mounting tubes 38. Eyehooks 44 may be carried on the handle 40. A fully retracted orientation of the handle assembly 14 is shown in FIG. 3, for example. A fully extended orientation of the handle assembly 14 is shown in FIG. 4, for example.

With particular reference to FIGS. 1, 2 and 5-10, the front, mid and rear canopy supports 16, 18 and 20 will be further described. As will be appreciated below, each of the canopy supports 16, 18 and 20 is pivotably coupled to the tab 12 for movement between a stowed position and a deployed position. Further, each of the canopy supports 16, 18 and 20 may be extendable. As will be appreciate more fully below, the front, mid and rear canopy supports 16, 18 and 20 cooperate to adjustably support a canvas or canopy.

Figure 5:
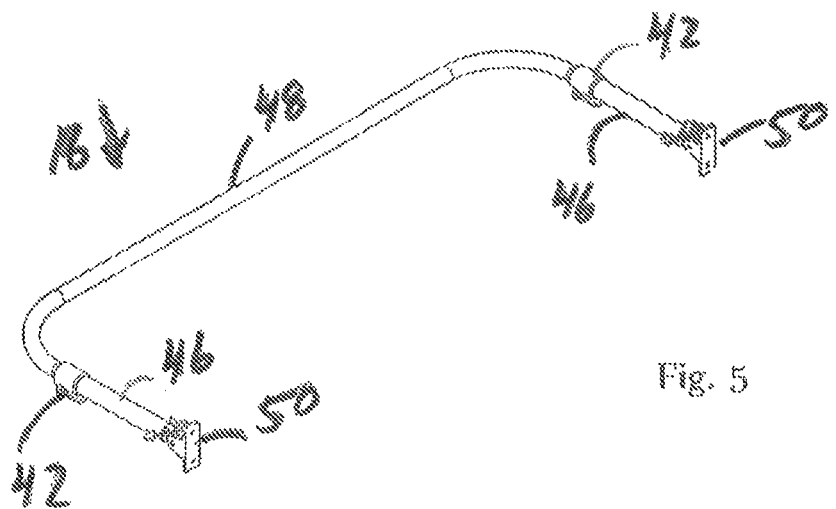
FIG. 5 is a perspective view of a front canopy support of the apparatus of the present teachings.
Figure 6:
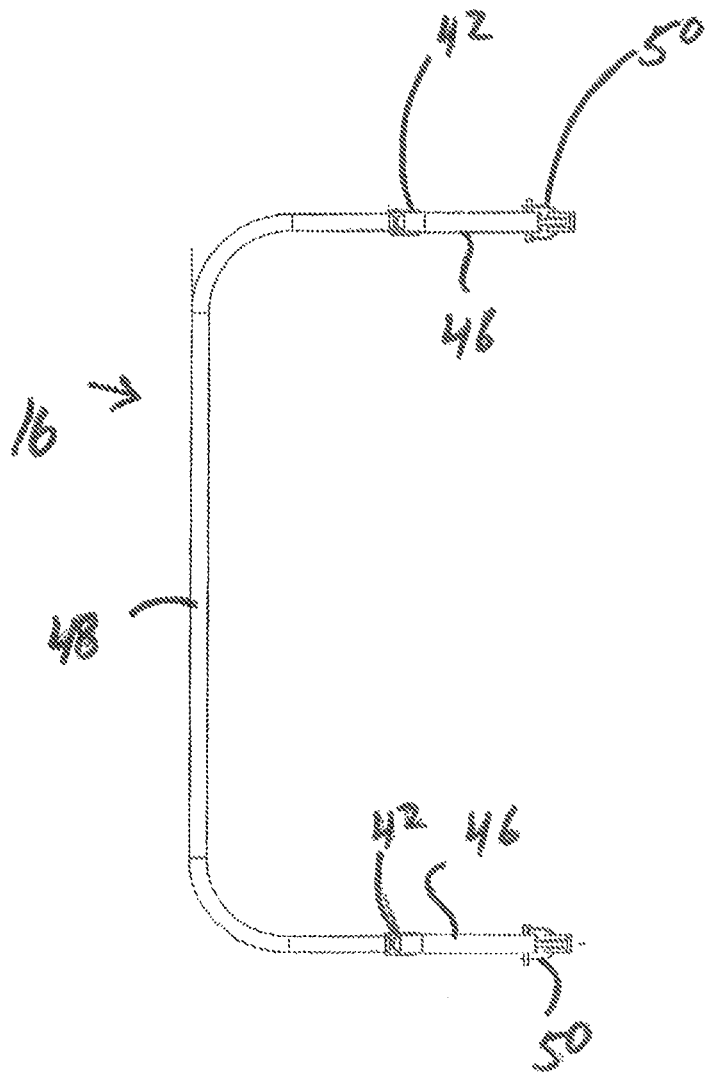
FIG. 6 is a plan view of the front canopy support of the apparatus of the present teachings.

The front canopy support 16 is shown most particularly in FIGS. 1, 2, 5 and 6. The front canopy support 16 is illustrated to generally include a pair of mounting tubes 46 and a cross member 48. The mounting tubes 46 may be pivotally coupled to the tub 12 with suitable mounting brackets 50 and any necessary bracing. In the embodiment illustrated, the mounting tubes 46 are circular in cross section. It will be understood, however, that alternative cross sections may be employed within the scope of the present teachings. The cross member 48 is generally U-shaped having a pair of legs connected by an intermediate portion. The legs have a cross section that cooperates with the mounting tubes 46 for telescopic adjustability. Thus, in the embodiment illustrated, the legs have a circular cross section. The legs are telescopically received within the mounting tubes 46. Latches 42 may be carried by both of the mounting tubes 46 for retaining the cross member 48 in a desired telescopic position relative to the mounting tubes 46. A retracted orientation of the cross member 48 is shown in FIG. 5, for example. An extended orientation of the cross member 48 is shown in FIG. 6, for example.

Figure 7:
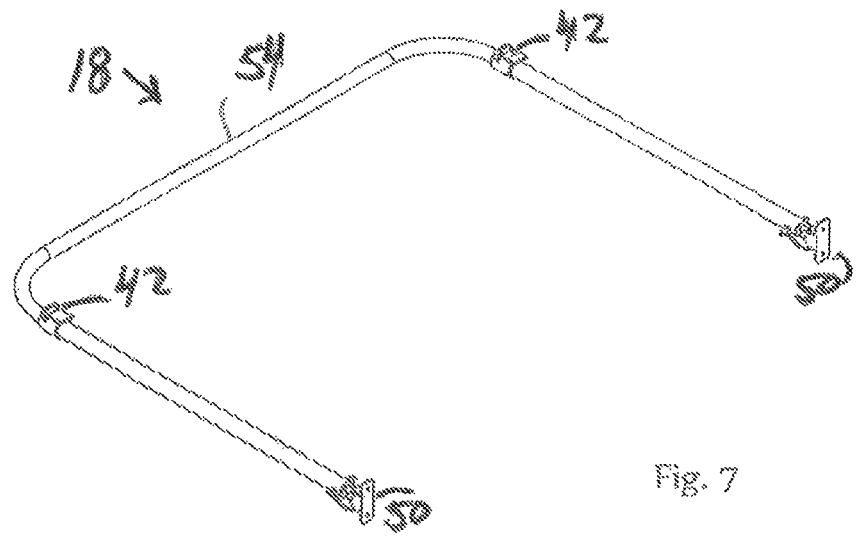
FIG. 7 is a perspective view of a mid-canopy support of the apparatus of the present teachings.
Figure 8:
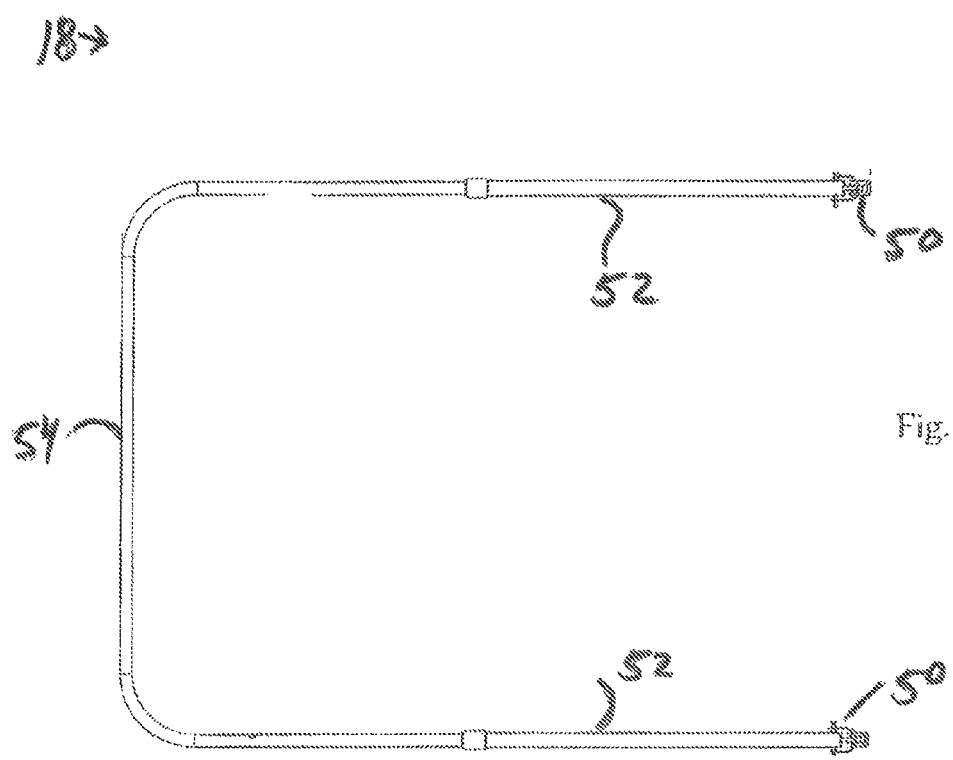
FIG. 8 is a plan view of the mid-canopy support of the apparatus of the present teachings.

With particular reference to FIGS. 1, 2, 7 and 8, the mid-canopy support 18 will be further described. The mid-canopy support 18 is illustrated to generally include a pair of mounting tubes 52 and a cross member 54. The mounting tubes 52 may be pivotally coupled to the tub 12 with suitable mounting brackets 50 and any necessary bracing. In the embodiment illustrated, the mounting tubes 52 are circular in cross section. As illustrated, the mounting tubes 52 are longer than the mounting tubes 46. It will be understood, however, that alternative cross sections may be employed within the scope of the present teachings. The cross member 54 is generally U-shaped having a pair of legs connected by an intermediate portion. The legs have a cross section that cooperates with the mounting tubes 52 for telescopic adjustability. Thus, in the embodiment illustrated, the legs have a circular cross section. The legs are telescopically received within the mounting tubes 52. Latches 42 may be carried by both of the mounting tubes 52 for retaining the cross member 54 in a desired telescopic position relative to the mounting tubes 52. A retracted orientation of the cross member 54 is shown in FIG. 7, for example. An extended orientation of the cross member 54 is shown in FIG. 8, for example.

Figure 9:
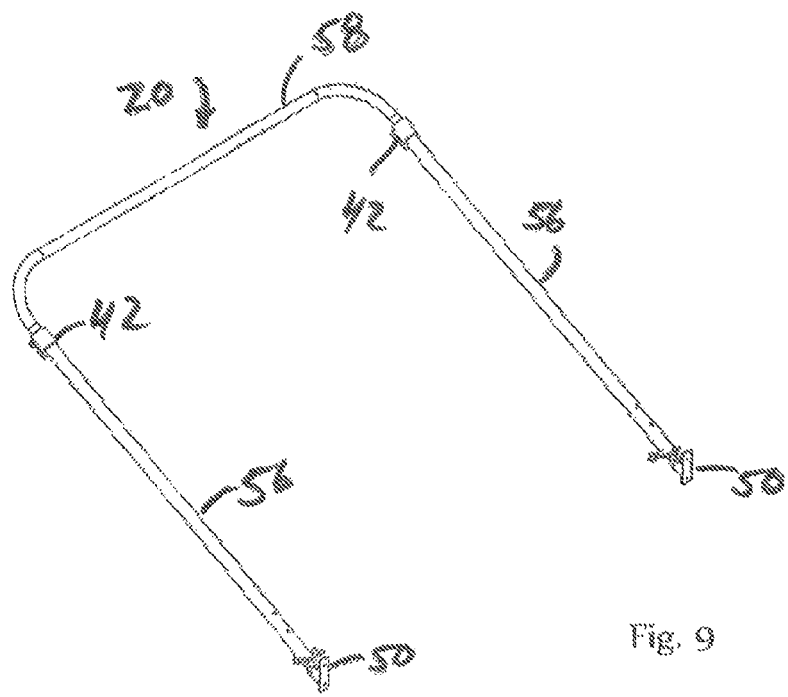
FIG. 9 is a perspective view of a rear canopy assembly of the apparatus of the present teachings.
Figure 10:
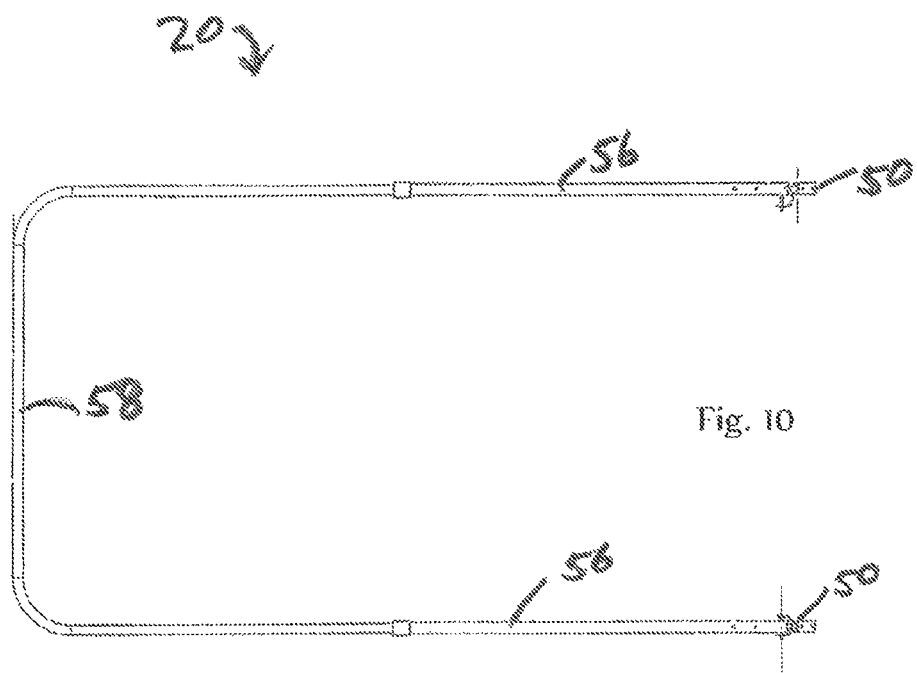
FIG. 10 is a plan view of the rear canopy support of the apparatus of the present teachings.
Figure 11:
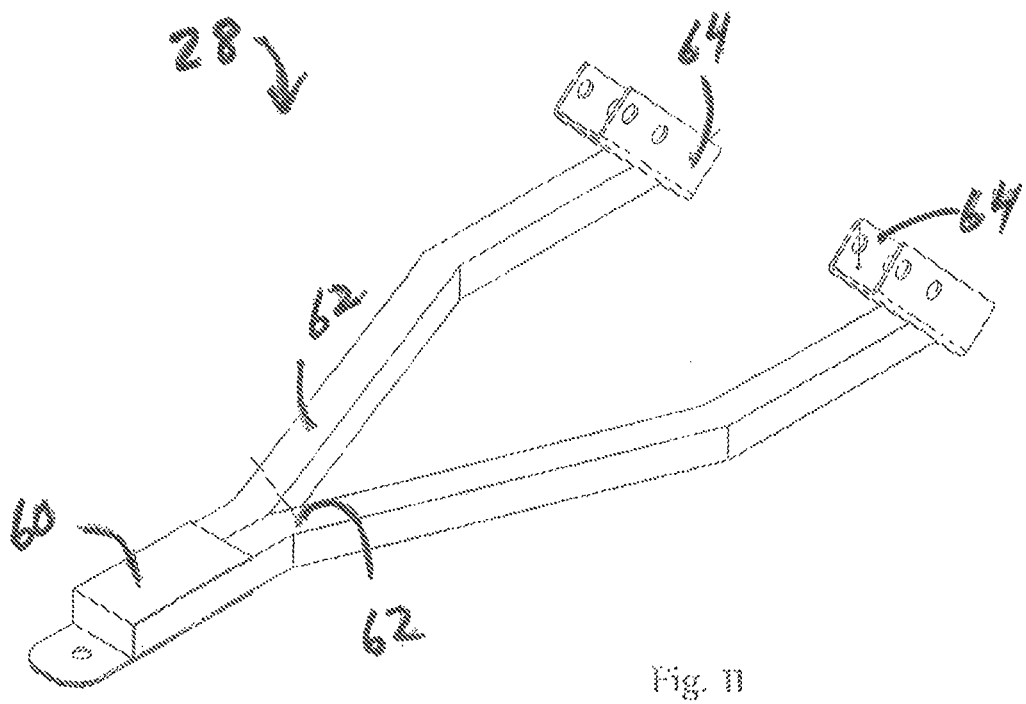
FIG. 11 is a perspective view of a hitch support of the apparatus of the present teachings.
Figure 12:
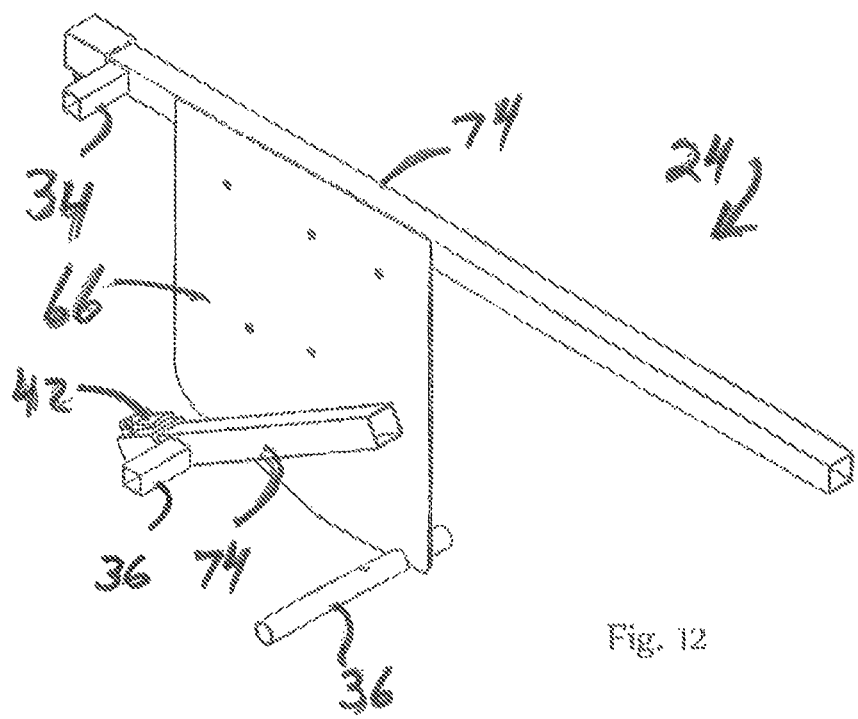
FIG. 12 is a perspective view of a frame assembly of the apparatus of the present teachings.
Figure 13:
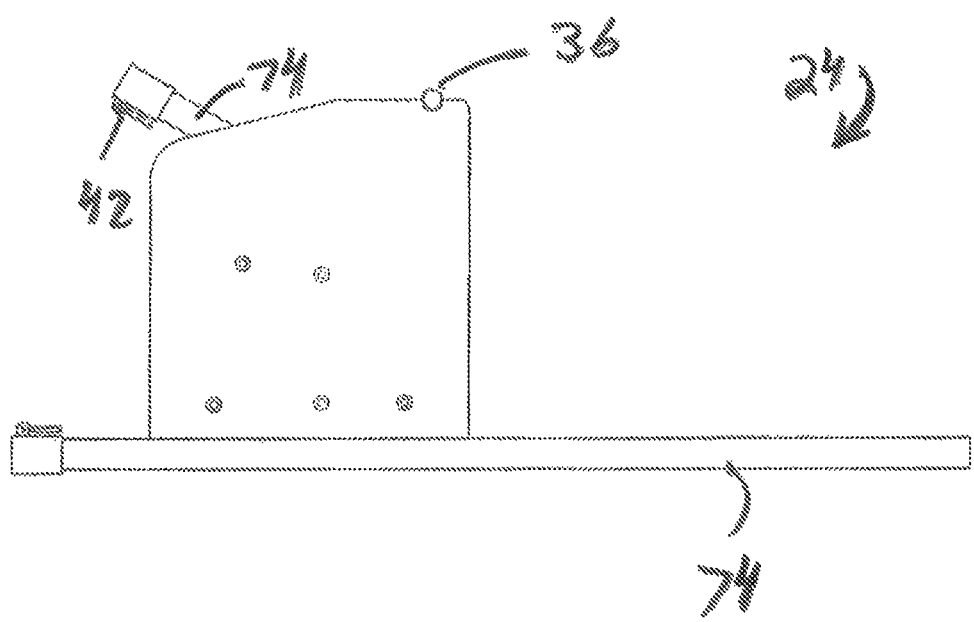
FIG. 13 is a plan view of the frame assembly of the apparatus of the present teachings.

With particular reference to FIGS. 1, 2, 9 and 10, the rear canopy support 20 will be further described. The rear canopy support 20 is illustrated to generally include a pair of mounting tubes 56 and a cross member 58. The mounting tubes 56 may be pivotally coupled to the tub 12 with suitable mounting brackets 50 and any necessary bracing. In the embodiment illustrated, the mounting tubes 56 are circular in cross section. As illustrated, the mounting tubes 56 are longer than the mounting tubes 52. It will be understood, however, that alternative cross sections may be employed within the scope of the present teachings. The cross member 58 is generally U-shaped having a pair of legs connected by an intermediate portion. The legs have a cross section that cooperates with the mounting tubes 56 for telescopic adjustability. Thus, in the embodiment illustrated, the legs have a circular cross section. The legs are telescopically received within the mounting tubes 56. Latches 42 may be carried by both of the mounting tubes 56 for retaining the cross member 58 in a desired telescopic position relative to the mounting tubes 56. A retracted orientation of the cross member 56 is shown in FIG. 9, for example. An extended orientation of the cross member 58 is shown in FIG. 10, for example.

With particular reference to FIGS. 1, 2, 11 and 12, the hitch assembly 28 will be further described. The hitch assembly 28 is shown to generally include tongue 60 for coupling to a towing vehicle. The hitch assembly further includes a pair of hitch arms 62. Each of the hitch arms 62 carries a mounting bracket 64. The mounting brackets 64 may be welded to or otherwise securely fastened to the hitch arms 62. In the embodiment illustrated, the mounting brackets 64 are U-shaped. The mounting brackets 64 may be secured to the tub 12 with fasteners and any required bracing.

With particularly reference to FIGS. 1, 2, 12, and 13 the frame assembly 24 for the left side of the tub 12 will be further described. It will be understood that the frame assembly 24 for the right side of the tub 12 may be a mirror image thereof. The frame assembly 24 is illustrated to include plate 66 that may be secured to the tub 12 with fasteners or in any other manner well known in the art. The plate 66 may be welding or otherwise secured to the lower tub support member 36. The plate 66 may also be welded or secured to elements of the support leg assembly 30 as will be described further below.

The wheel and axle assembly 24 is shown to include an axle and a pair of wheels 68. The axle passes through the axle tube 32 which is secured to the tub 12. In this manner, the axle is rotatably coupled to the tub 12.

The support leg assembly includes a plurality of legs. As shown, the plurality of legs includes first, second, third and fourth adjustable legs. Each leg includes a mounting portion and a telescopic portion. Each telescopic portion may be non-rotatably attached to the tub 12.

The plurality of legs of the support leg assembly 30 define a first pair of legs or a pair of forward legs 70 and a second pair of legs or a pair of rear legs 72. Each of the legs 70 and 72 includes a mounting member 74 and an extendable member or telescopic member 76. The mounting members 74 are welded or otherwise secured to the plate 66 of the frame assemblies 24. In the embodiment illustrated, the mounting members 74 are rectangular in cross section. It will be understood, however, that alternative cross sections may be employed within the scope of the present teachings. The extendable members 76 legs have a cross section that cooperates with the mounting members 74 for telescopic adjustability. Thus, in the embodiment illustrated, the extendable members 76 have a rectangular cross section. The extendable members 76 are telescopically received within the mounting members 74. Latches 42 may be carried by the mounting members 74 for retaining the extendable members 76 in a desired telescopic position relative to the mounting member 74. Importantly, each of the extendable members 76 is independently adjustable relative to a respective mounting member 74. In this manner, the support leg assembly 30 may accommodate for uneven ground.

Figure 14:
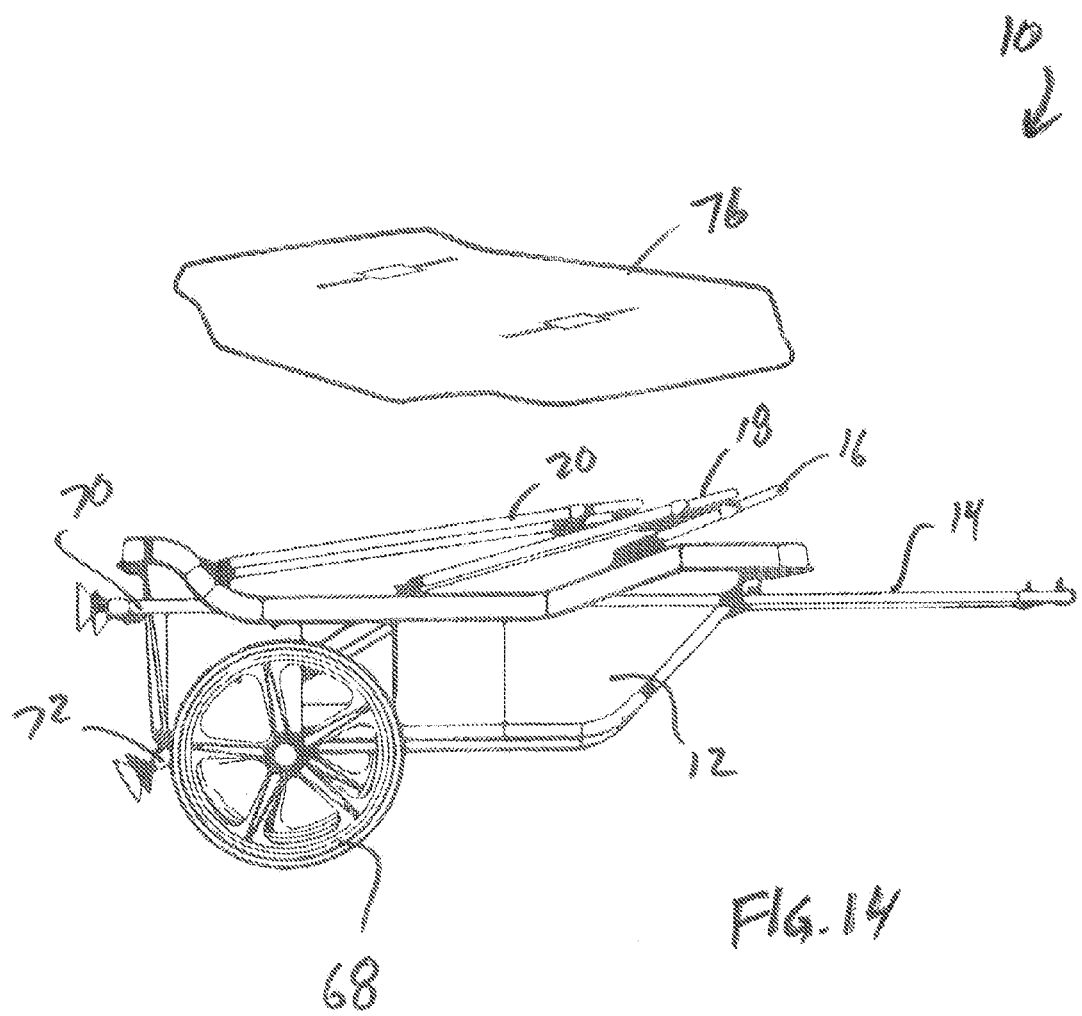
FIG. 14 is a side view of the apparatus for outdoorsmen of the present teachings shown to include a cover.

With reference to FIG. 14, the apparatus 10 of the present teachings is shown to include a tarp or cover 76 for covering the tub 12 during transportation, for example.

Figure 15:
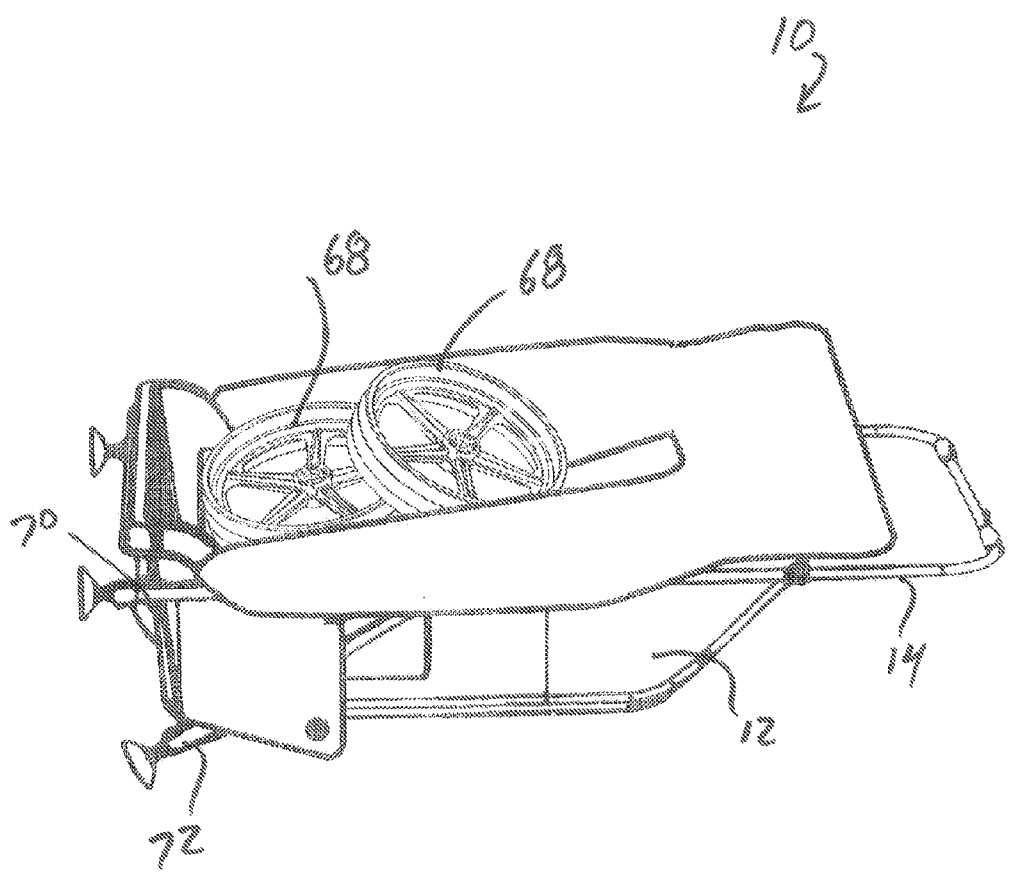
FIG. 15 is a perspective view of the apparatus for outdoorsmen of the present teachings shown collapsed for transportation.

With reference to FIG. 15, the apparatus 10 is shown with the wheels 68 removed. In this orientation, the tub 12 may function as a sled or may buoyantly be used in water.

Figure 16:
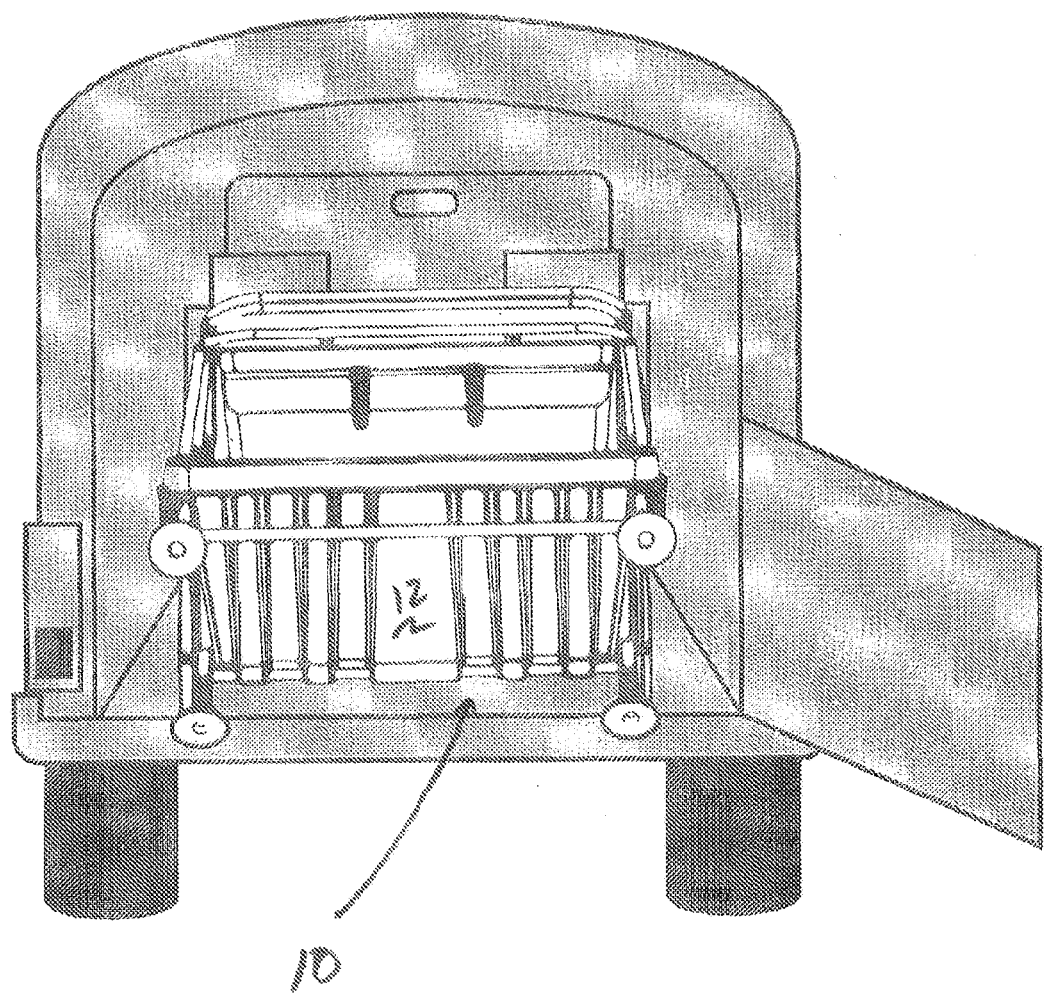
FIG. 16 is a view of the apparatus for outdoorsmen shown collapsed in a vehicle for transportation.

With reference to FIG. 16, of the apparatus 10 of the present teachings is shown collapsed in a vehicle for transportation.

Figure 17:
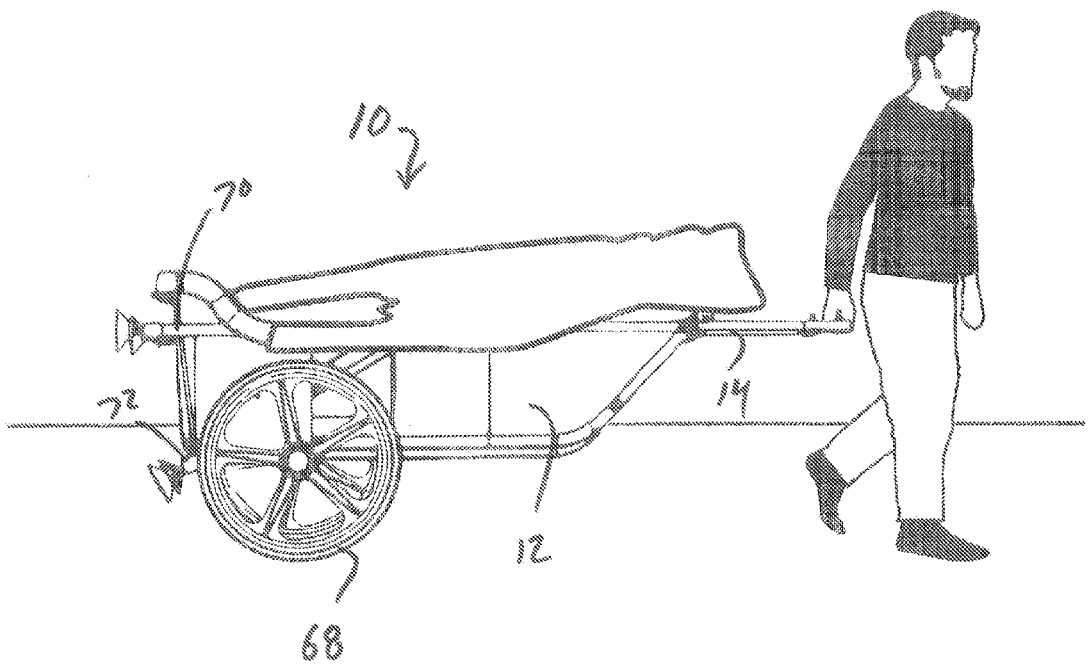
FIG. 17 is a view illustrating the apparatus for outdoorsmen of the present teachings being transported by a user.

With reference to FIG. 17, the apparatus 10 of the present teachings is shown being transported by a user. The handle 40 is extended.

Figure 18:
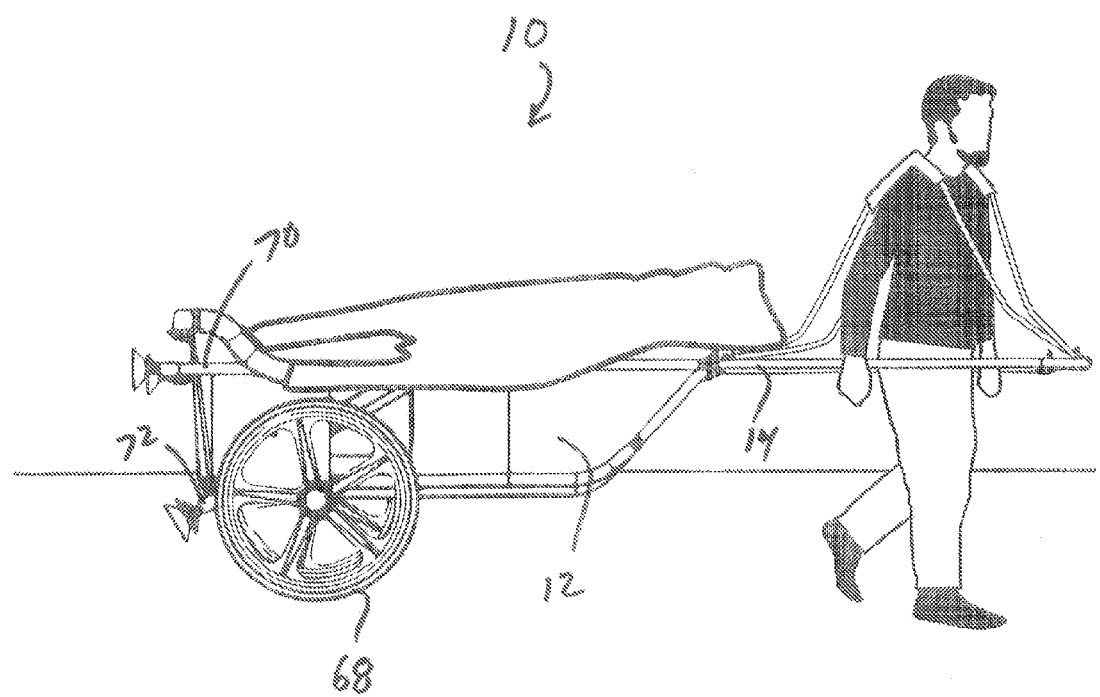
FIG. 18 is another view illustrating the apparatus for outdoorsmen of the present teachings being transported by a user, the user additionally utilizing a shoulder harness.

With reference to FIG. 18, the apparatus 10 of the present teachings is again shown being transported by a user. As shown in this view, the user additionally may utilize a shoulder harness.

With reference to FIG. 18, the apparatus 10 of the present teachings is again shown being transported by a user. As shown in this view, the tub 12 may provide buoyance for transporting the apparatus 10 in water. The apparatus 10 may be used in this mode with or without the wheels 68 carried by the tub 12.

Figure 19:
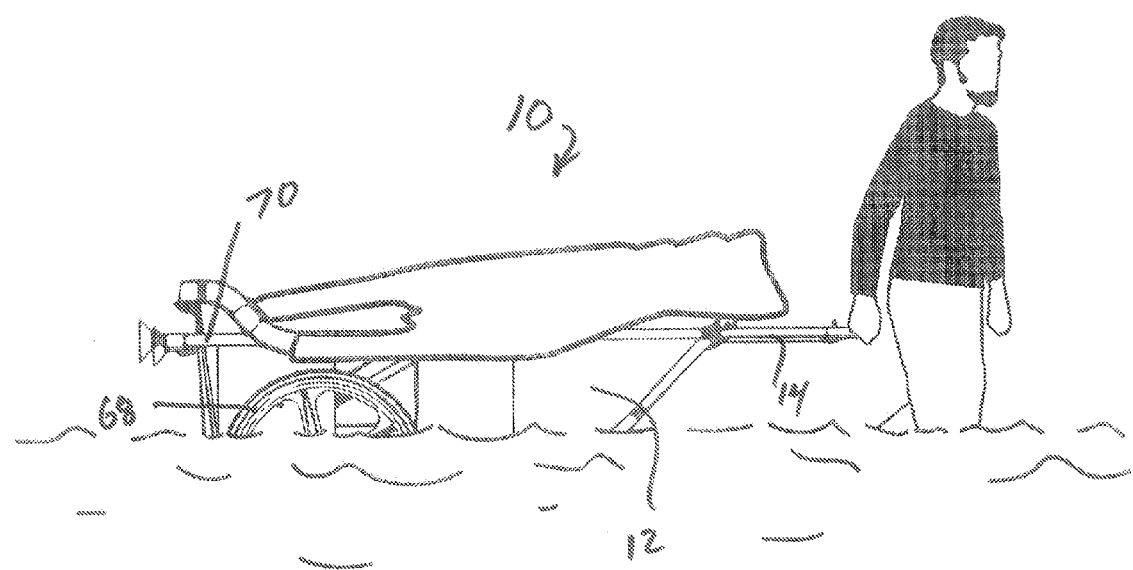
FIG. 19 is another view illustrating the apparatus for outdoorsmen of the present teachings being transported by a user, the apparatus shown floating through shallow water.
Figure 20:
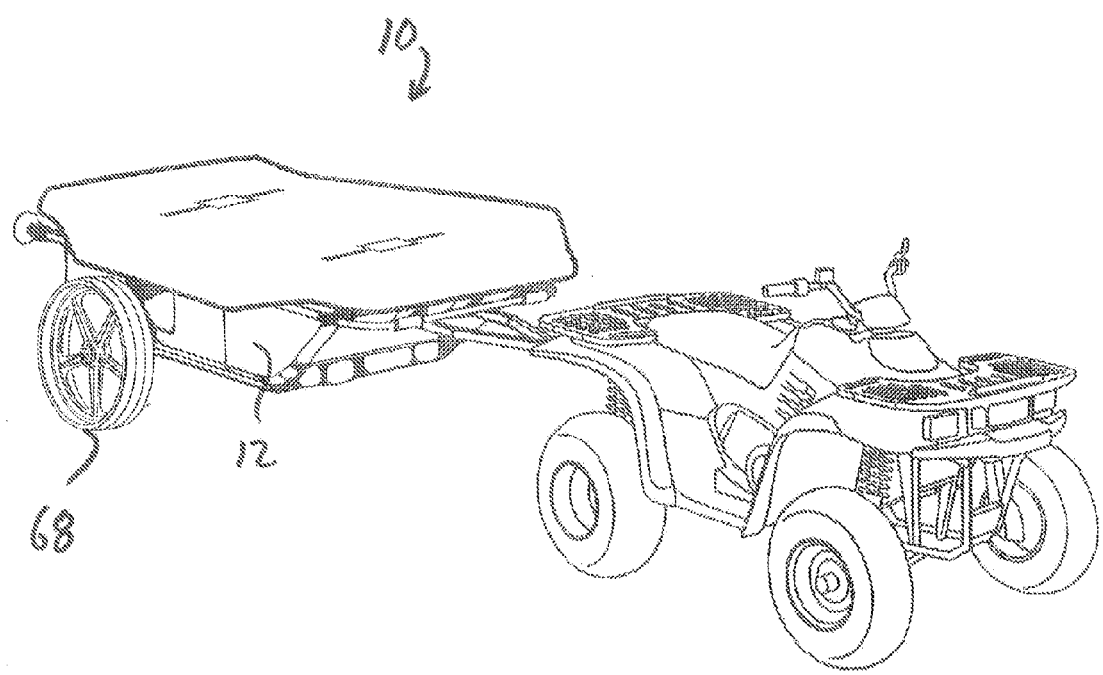
FIG. 20 is a perspective view of the apparatus for outdoorsmen of the present teachings coupled to an all-terrain vehicle for towing.
Figure 21:
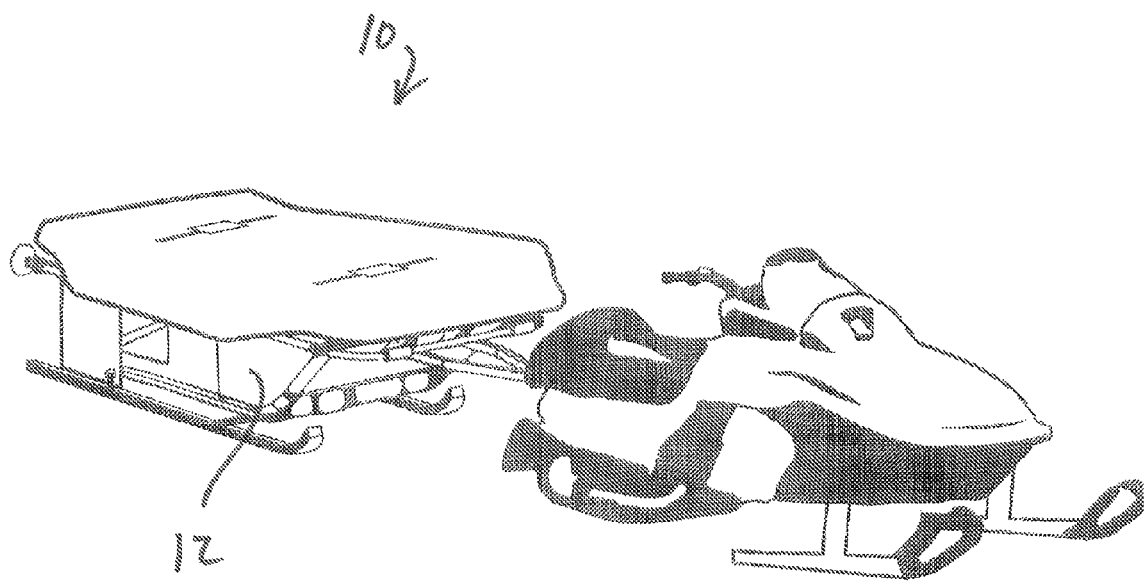
FIG. 21 is a perspective view of the apparatus for outdoorsmen of the present teachings coupled to a snowmobile for towing.

With reference to FIGS. 19 and 20, the apparatus 10 of the present teachings is shown operatively coupled to a vehicle for towing. In FIG. 20, the exemplary vehicle is illustrated as an all-terrain vehicle. In FIG. 21, the exemplary vehicle is illustrated as a snowmobile. FIG. 21 further illustrates that the apparatus 10 may be alternatively equipped with a sled assembly including a pair of skis. It will be appreciated that the sled assembly may be secured to the tub 12 in a manner similar to that used to secure the wheel and axle assembly 22 to the tub 12.

Figure 22:
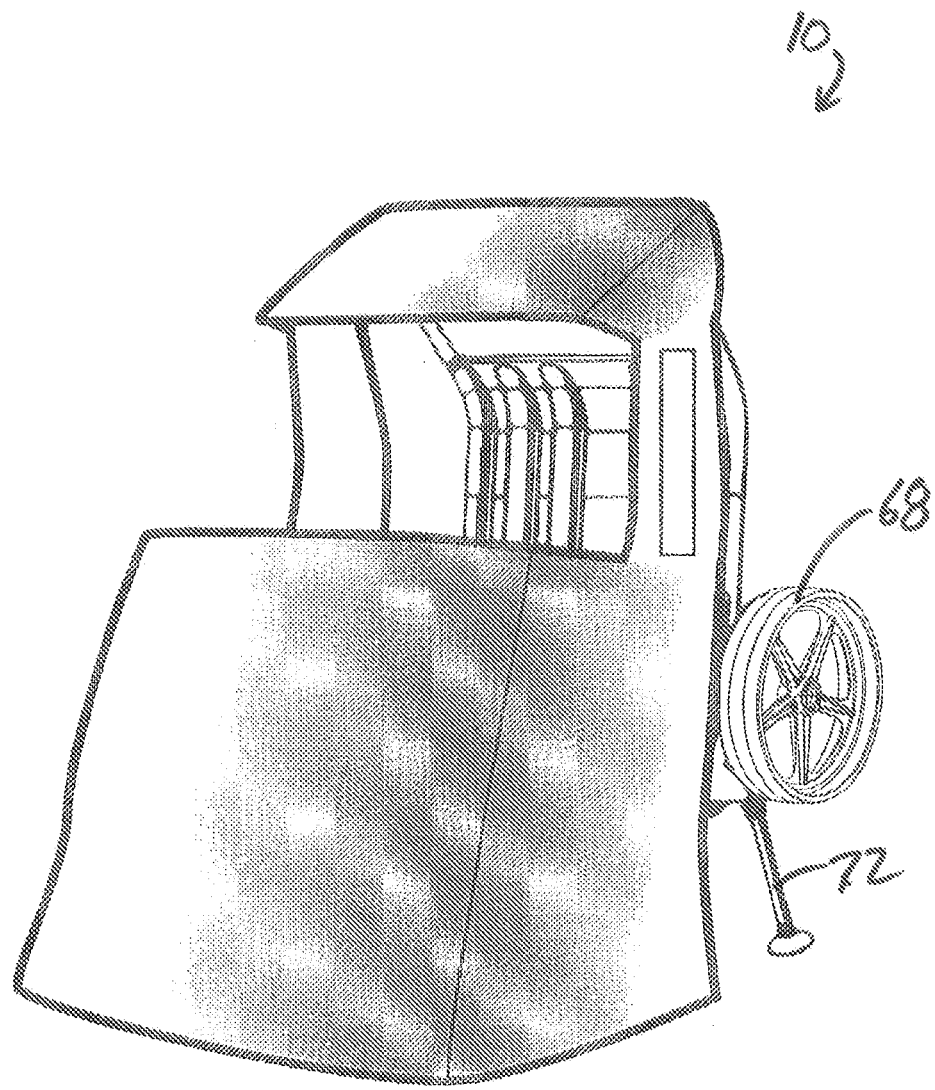
FIG. 22 is a perspective view of the apparatus for outdoorsmen of the present teachings shown to include a hunting canvas and set up in a first orientation for hunting.
Figure 23:
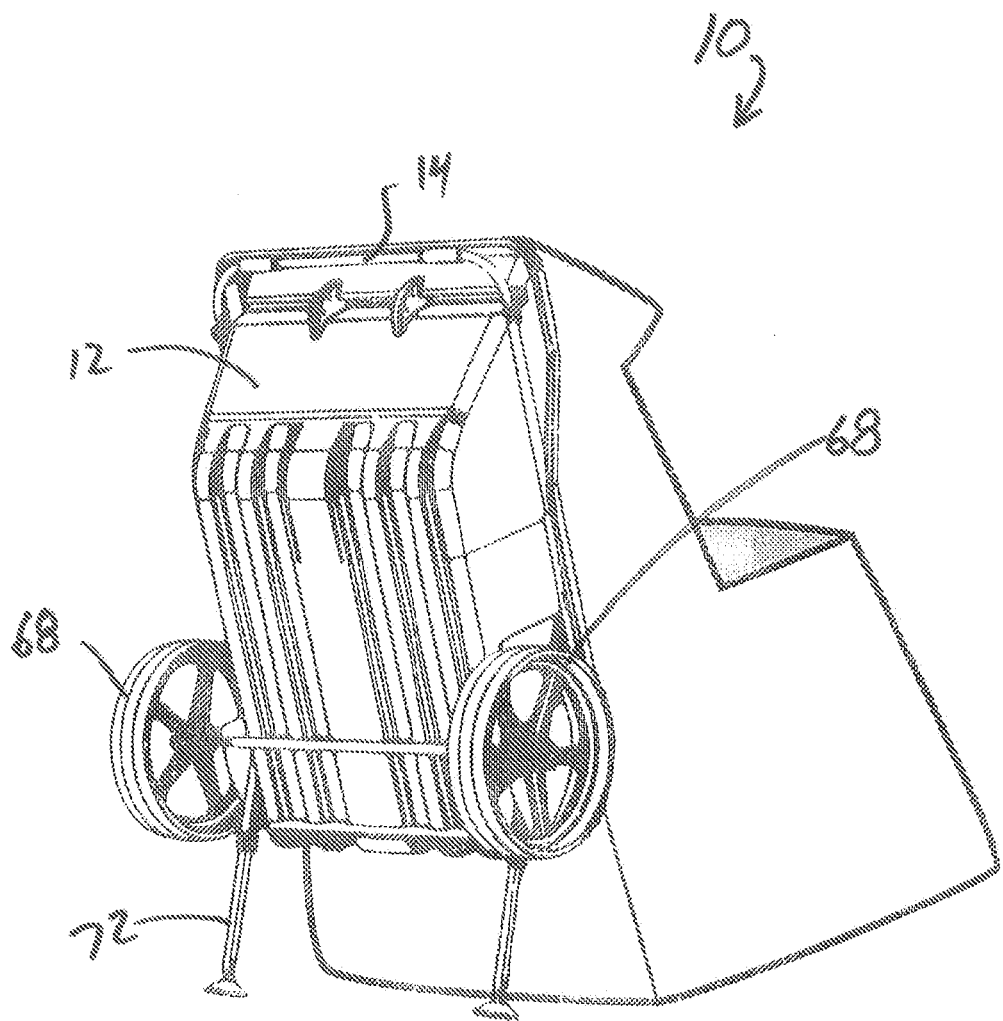
FIG. 23 is another perspective view of the apparatus for outdoorsmen of the present teachings shown in the hunting orientation of FIG. 22.
Figure 24:
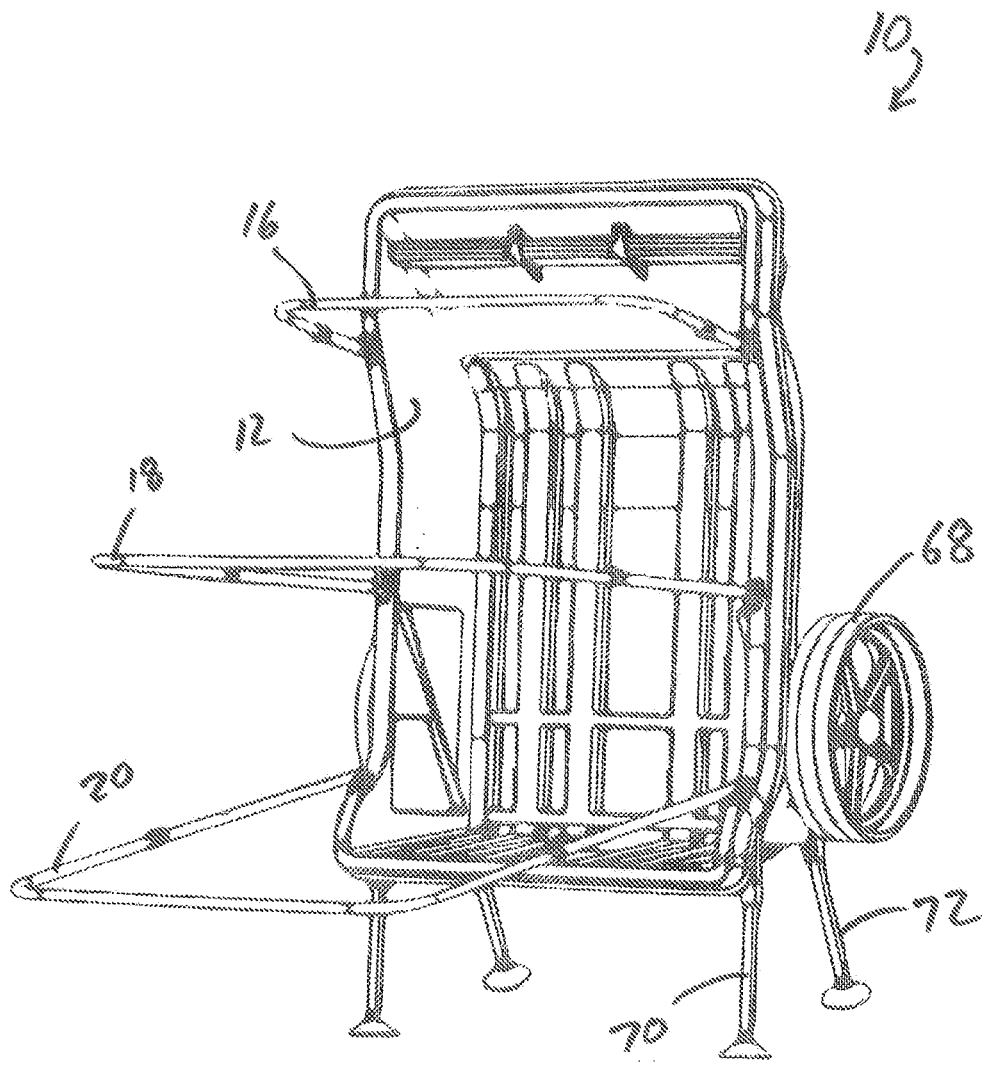
FIG. 24 is a perspective view similar to FIG. 24 illustrating the apparatus for outdoorsmen of the present teachings with the hunting canvas removed for purposes of illustration.

With reference to FIGS. 22 through 24, the apparatus 10 of the present teachings is shown in an exemplary use orientation. In this orientation, the apparatus 10 may be used for hunting, for example. FIGS. 22 and 23 show the apparatus 10 operatively associated with a canvas. The canvas serves to conceal the hunter and protect the hunter from the elements. The front, mid and rear canopy supports 16, 18 and 20 cooperate to adjustably support the canvas. The apparatus 10 may similarly be used with a crossbow or other device.

Figure 25:
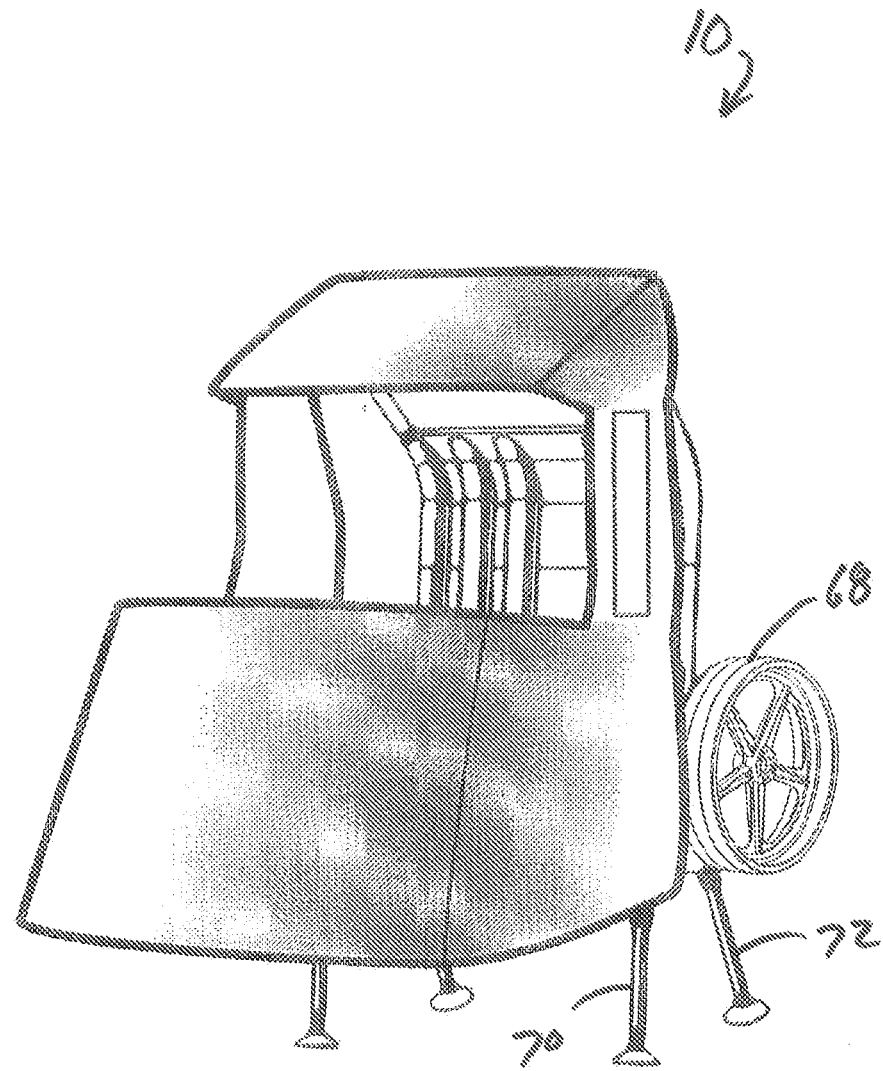
FIG. 25 is another view similar to FIG. 24 illustrating the apparatus for outdoorsmen of the present teachings to include an alternative hunting canvas.
Figure 26:
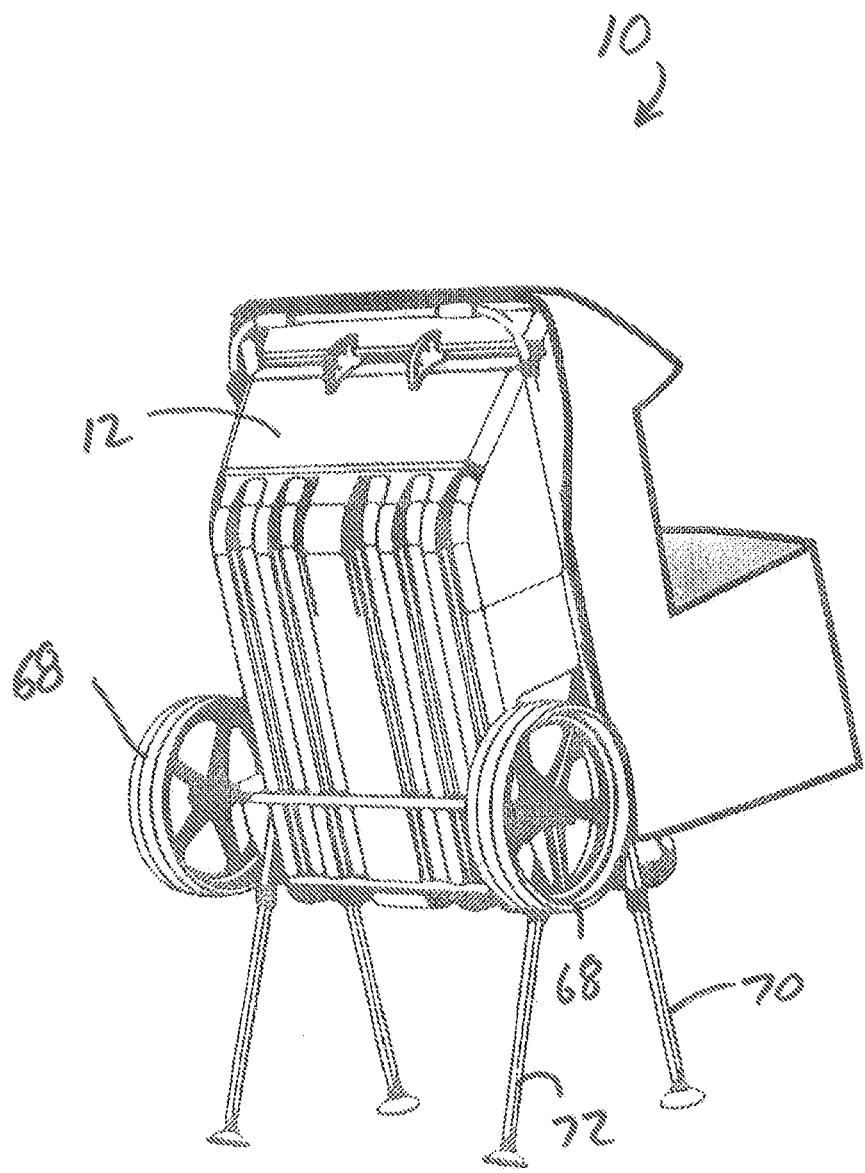
FIG. 26 is another perspective view of the apparatus for outdoorsmen of the present teachings including the alternative hunting canvas of FIG. 25.

With reference to FIGS. 25 and 26, the apparatus 10 of the present teachings is shown operatively associated with an alternative canvas. The alternative canvas may be particularly adapted for waterfowl hunting, for example. FIG. 26 shows longer legs at 22" from a standard height of 16".

Figure 27:
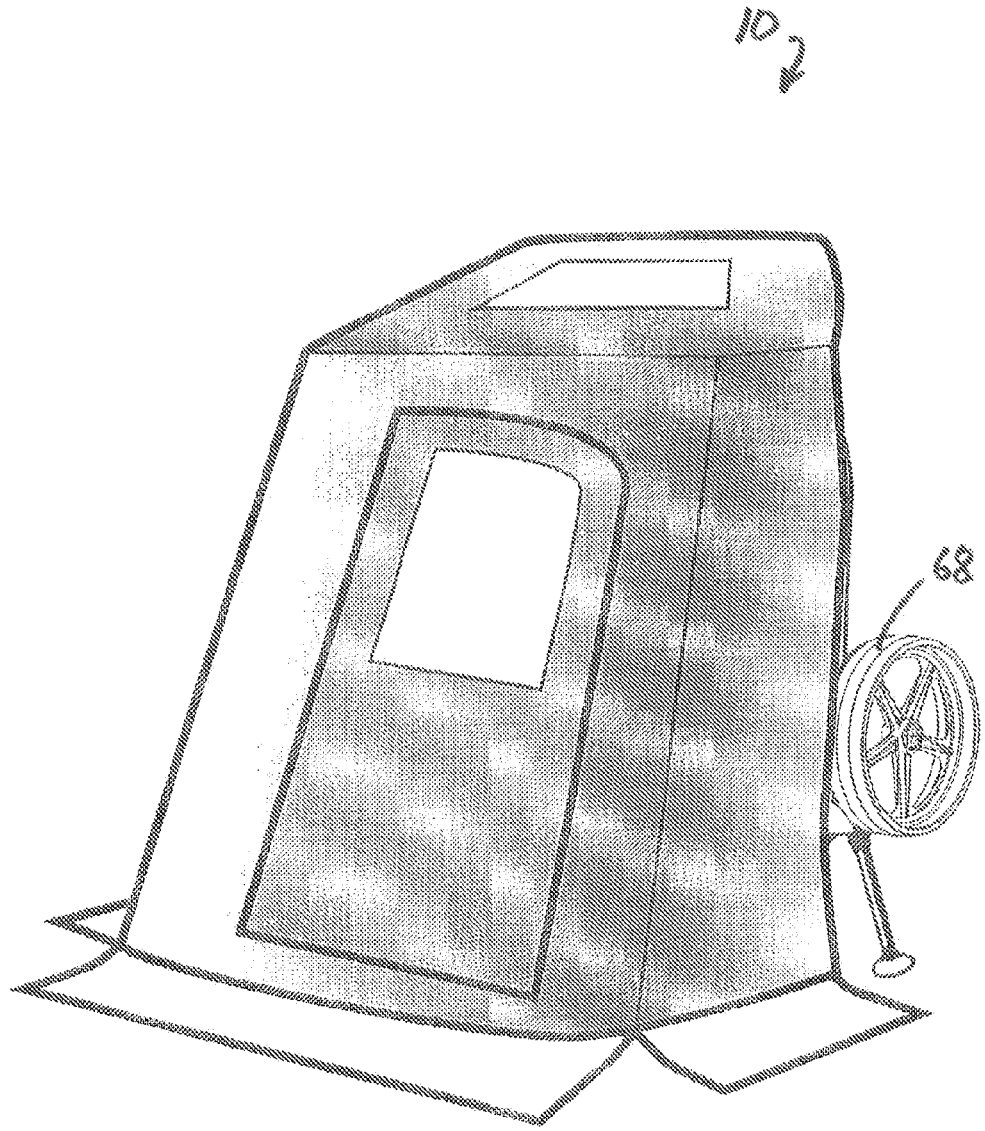
FIG. 27 is a perspective view of the apparatus for outdoorsmen of the present teachings including an ice fishing canvas and set up in a second orientation for ice fishing.
Figure 28:
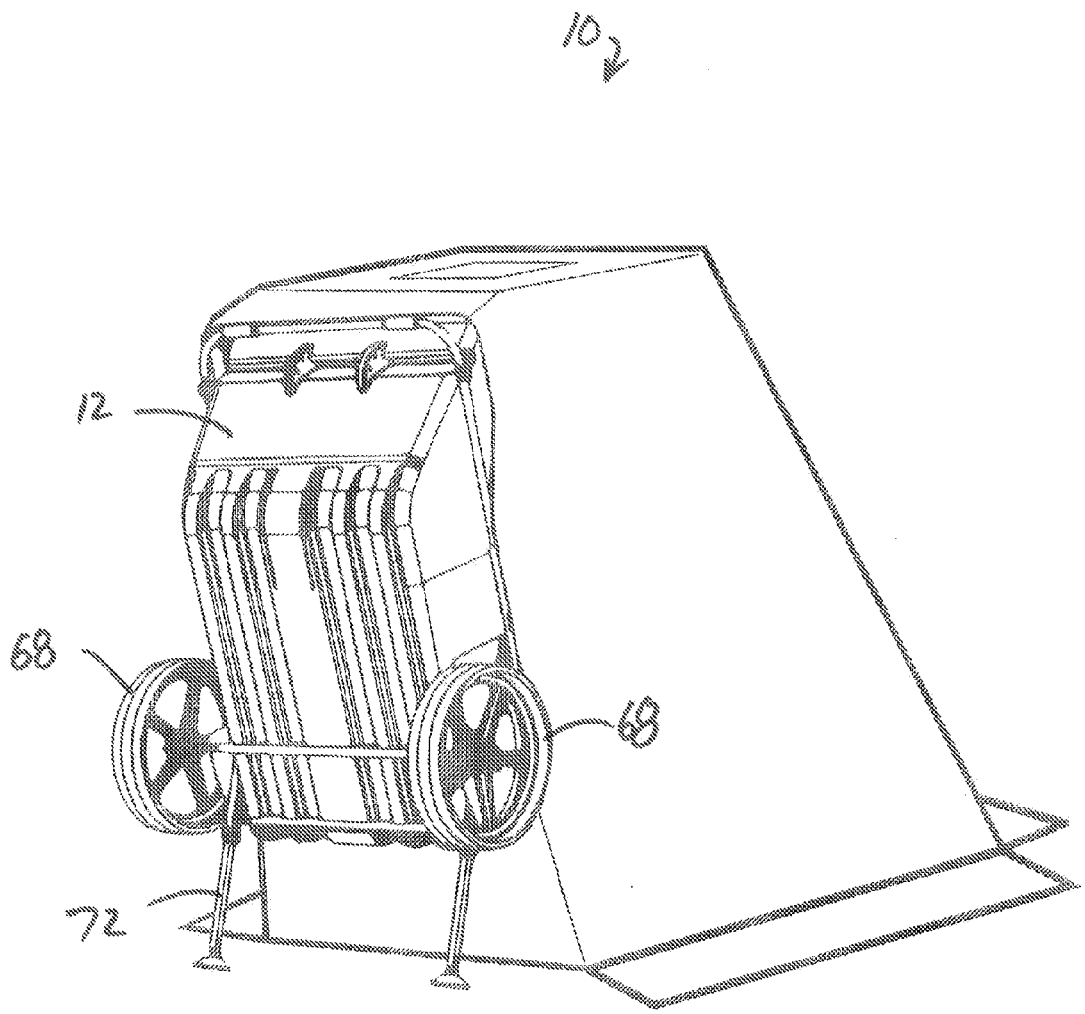
FIG. 28 is another perspective view of the apparatus for outdoorsmen of the present teachings shown in the hunting orientation of FIG. 27.
Figure 29:
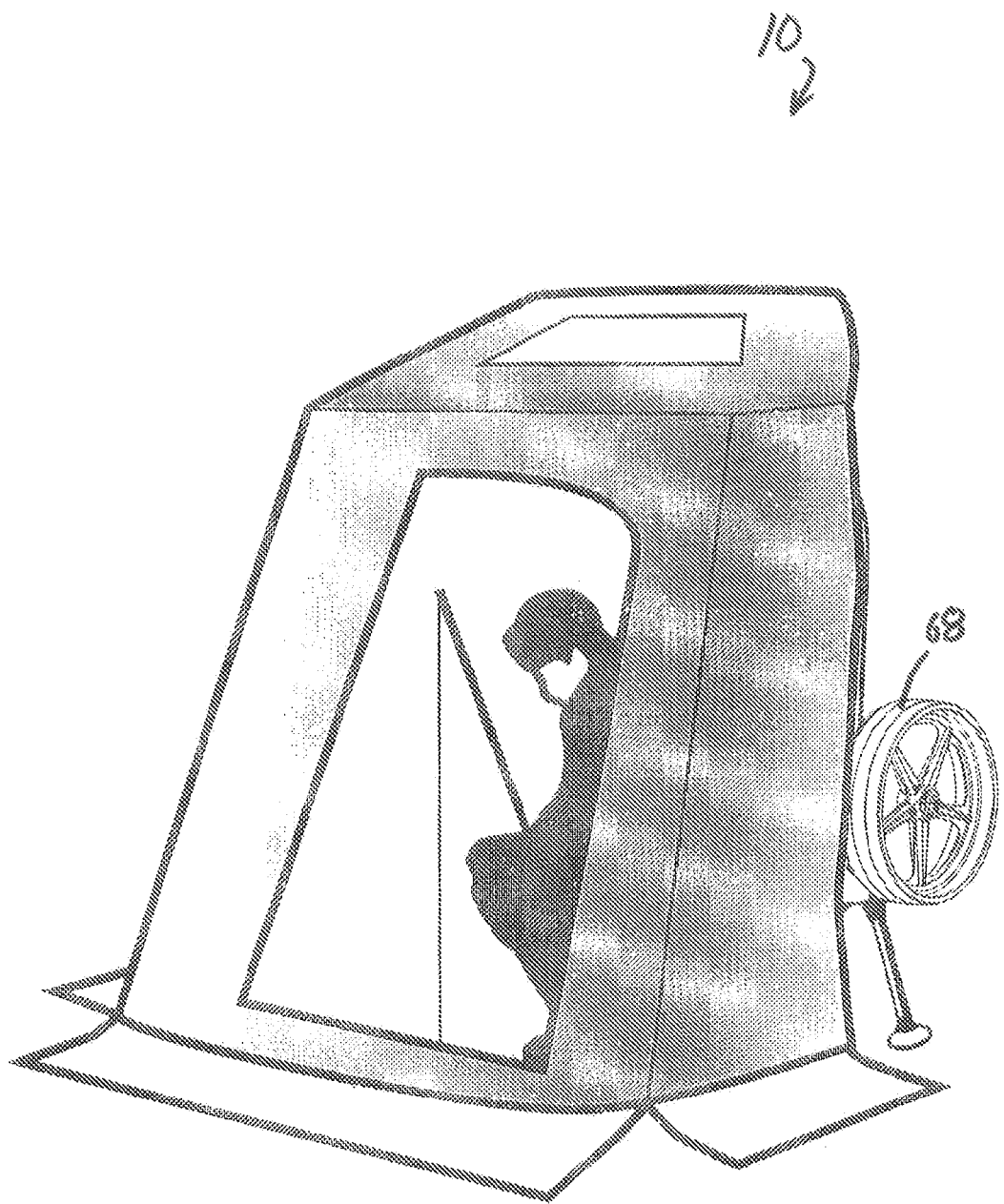
FIG. 29 is another perspective view of the apparatus for outdoorsmen of the present teachings shown in the hunting orientation of FIG. 27.

With reference to FIGS. 27 through 29, the apparatus 10 of the present teachings is shown operatively associated with another alternative canvas. The alternative canvas may be particularly adapted for ice fishing, for example.

Figure 30:
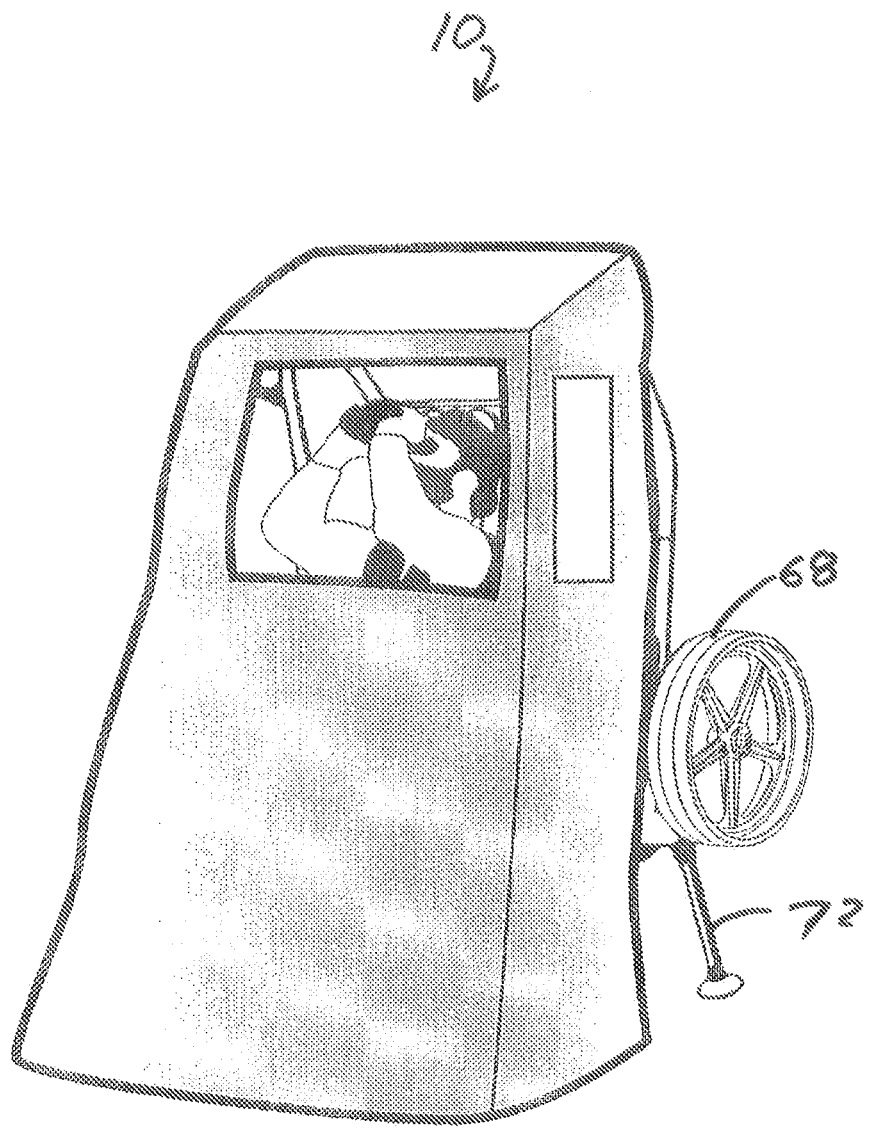
FIG. 30 is a perspective view of the apparatus for outdoorsmen of the present teachings including a bird watching canvas and set up in a third orientation for bird watching.

With reference to FIG. 30, the apparatus 10 of the present teachings is shown oriented for bird watching, for example. In this orientation, the apparatus 10 may also be used for hunting filming and other activities.

Accordingly, it will be appreciated that the present teachings provide an apparatus for transporting hunting and fishing gear that also may be configured in various orientations to provide various shelters. The apparatus 10 is particularly adapted to accommodate uneven group.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an,"

and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A multi-use apparatus for outdoorsmen comprising:
    a tub having an open upper side;
    a first, second, third and fourth adjustable legs mounted to the tub, each of the legs including a mounting member and a telescopic member, each mounting member non-rotatably mounted to the tub;
    first and second mounting plates secured to opposite sides of the tub, the mounting members of the first and second legs secured to the first mounting plate, the mounting members of the third and fourth legs secured to the second mounting plate; and
    a first support member connecting the mounting members of the first and third adjustable legs, the first support member extending perpendicular to the first and third adjustable legs and disposed rearwardly of a rear side of the tub.

2. The multi-use apparatus of claim 1, further comprising a pair of wheels coupled to the tub through an axle, the mounting members of each adjustable leg mounted to the tub proximate the axle.

3. The multi-use apparatus of claim 1, wherein each telescopic portion is independently adjustable relative to a respective mounting member, and
    further wherein each telescopic portion extends away from the tub in a direction perpendicular to the rear wall.

4. The multi-use apparatus of claim 1, wherein the first and second legs are oriented at an angle relative to the second and third legs.

5. The multi-use apparatus of claim 1, wherein the mounting members of the third and fourth legs are connected with a second support member, the second support member extending perpendicular to the second and fourth adjustable legs and located proximate to an intersection of the rear side of the tub and a bottom of the tub.

6. The multi-use apparatus of claim 5, wherein the first and second support members are secured to the tub.

7. The multi-use apparatus of claim 1, further comprising at least one cover for cooperating with the tub to define an enclosure for the user.

8. The multi-use apparatus of claim 7, wherein the at least one cover has a rear opening, the cover attached to a periphery surrounding the open upper side of the tub and the rear opening aligning with the open upper side of the tub.

9. A multi-use apparatus for outdoorsmen comprising:
    a tub having an open upper side, first and second lateral walls, a bottom wall and a rear wall;
    first and second mounting plates secured to the first and second lateral walls;
    first and second adjustable legs secured to the first and second mounting plates, respectively, the first and second adjustable legs being parallel to an adjacent to the open upper side of the tub;
    third and fourth adjustable legs secured to the first and second mounting plates, respectively; and
    a first support member connecting the mounting members of the first and third adjustable legs, the first support member extending perpendicular to the first and third adjustable legs and disposed rearwardly of a rear side of the tub.

10. The multi-use apparatus of claim 9, wherein the first and second adjustable legs are parallel to one another and the third and fourth adjustable legs are parallel to one another.

11. The multi-use apparatus of claim 10, wherein the first and second adjustable legs are angled relative to the third and fourth adjustable legs.

12. The multi-use apparatus of claim 9, wherein the adjustable portion of each adjustable leg is independently adjustable relative to a respective mounting portion.

13. The multi-use apparatus of claim 9, further comprising a second support member connecting the second and fourth adjustable legs, the second support member extending perpendicular to the second and fourth adjustable legs and located proximate to an intersection of the rear side of the tub and a bottom of the tub.

14. The multi-use apparatus of claim 9, wherein the first, second, third and fourth adjustable legs each extend away from the tub in a direction perpendicular to the rear wall of the tub.

15. The multi-use apparatus of claim 9, further comprising at least one cover for cooperating with the tub to define an enclosure for the user.

16. The multi-use apparatus of claim 15, further comprising front, rear and mid canopy supports each pivotably coupled to the tub for articulation between a stowed position and a deployed position, the front, mid and rear canopy supports cooperating to support the cover; and wherein the enclosure is defined at a rear side thereof by the tub.

17. A multi-use apparatus for outdoorsmen comprising:

a tub having an open upper side;

a first, second, third and fourth adjustable legs mounted to the tub, each of the legs including a mounting member and a telescopic member, each mounting member non-rotatably mounted to the tub;

first, second and third canopy supports each pivotably attached to the tub and movable to a deployed position; and a cover for cooperating with the tub to define an enclosure for the user, the cover supported by the first, second and third canopy supports.

18. The multi-use apparatus of claim 17, wherein the cover has a front opening, and further wherein the first canopy support is disposed above the front opening and the second canopy support is disposed below the front opening.

19. The multi-use apparatus of claim 17, wherein the tub is generally rectangular.

20. The multi-use apparatus of claim 17, further comprising front, rear and mid canopy supports each pivotably coupled to the tub for articulation between a stowed position and a deployed position, the front, mid and rear canopy supports cooperating to support the cover; and wherein the enclosure is defined at a rear side thereof by the tub.

* * * * *